US006283902B1

(12) United States Patent
Bakoledis

(10) Patent No.: US 6,283,902 B1
(45) Date of Patent: Sep. 4, 2001

(54) ROLLER RING

(75) Inventor: Andrew Bakoledis, Chester, CT (US)

(73) Assignee: GBR Systems Corporation, Chester, CT (US)

(*) Notice: Subject to any disclaimer, the term of this patent is extended or adjusted under 35 U.S.C. 154(b) by 0 days.

(21) Appl. No.: 09/495,339

(22) Filed: Feb. 1, 2000

Related U.S. Application Data

(63) Continuation of application No. 09/129,235, filed on Aug. 5, 1998, now abandoned.

(51) Int. Cl.[7] .................................................. F16C 13/00
(52) U.S. Cl. .......................................... 492/30; 492/38
(58) Field of Search ............................ 492/30, 28, 38; 29/898.054

(56) References Cited

U.S. PATENT DOCUMENTS

| | | | | |
|---|---|---|---|---|
| 556,819 | * | 3/1896 | Hartman | 29/513 |
| 1,095,839 | | 5/1914 | Fritz . | |
| 1,271,077 | | 7/1918 | Probasco . | |
| 1,680,369 | * | 8/1928 | Dugan | 29/514 |
| 1,859,045 | | 5/1932 | Monckmeier . | |
| 2,026,261 | | 12/1935 | Vigne . | |
| 2,283,918 | * | 5/1942 | Dekome | 29/149.5 |
| 2,464,653 | | 3/1949 | Phipps . | |
| 2,481,931 | | 9/1949 | Kester . | |
| 2,594,587 | | 4/1952 | Riordan . | |
| 2,740,274 | | 4/1956 | Lebocey . | |
| 2,762,117 | * | 9/1956 | Houck | 29/521 |
| 2,762,118 | * | 9/1956 | Shaw et al. | 29/521 |
| 2,855,252 | * | 10/1958 | Budinger et al. | 29/513 |
| 3,007,754 | | 11/1961 | Cress . | |
| 3,091,844 | * | 6/1963 | Laine | 228/135 |
| 3,100,929 | | 8/1963 | Nisper . | |
| 3,238,601 | * | 3/1966 | White | 29/149.5 |
| 3,255,510 | | 6/1966 | Josephson et al. . | |
| 4,102,419 | | 7/1978 | Klima . | |
| 4,318,636 | * | 3/1982 | Thomas | 405/153 |
| 4,395,195 | * | 7/1983 | Cosmo et al. | 415/137 |
| 4,395,900 | * | 8/1983 | Sauernman | 72/368 |
| 4,611,373 | | 9/1986 | Hazelbrook . | |
| 4,732,492 | | 3/1988 | Bonfils . | |
| 4,907,626 | * | 3/1990 | Mori | 138/156 |
| 4,909,638 | | 3/1990 | Muto . | |
| 5,466,410 | | 11/1995 | Hills . | |
| 5,522,515 | * | 6/1996 | Pech et al. | 212/175 |
| 5,524,410 | * | 6/1996 | Menchetti | 52/729.2 |
| 5,657,526 | | 8/1997 | Yatcko . | |
| 6,085,550 | * | 7/2000 | Ishida | 63/15.65 |

FOREIGN PATENT DOCUMENTS

| | | |
|---|---|---|
| 183617 | 4/1907 | (DE) . |
| 6081846 | 3/1994 | (JP) . |

* cited by examiner

*Primary Examiner*—S. Thomas Hughes
*Assistant Examiner*—M Butler
(74) *Attorney, Agent, or Firm*—Joseph J. Previto

(57) ABSTRACT

An envelope machine having a roller assembly with a groove in the roller and a ring assembly removably mounted in the groove. The ring assembly has a pair of half-rings segments removably mounted in the groove, each of which are adapted to mesh and interfit with each other to form the ring assembly. The ring assembly lies below the surface of the roller and each ring segment has a holding notch at one end and a key assembly at the other end, with the holding notch of one ring segment adapted to interfit and mesh with the key assembly of another ring segment.

5 Claims, 2 Drawing Sheets

ROLLER RING

This application is a continuation of U.S. application Ser. No. 09/129,235 filed Aug. 5, 1998 abandoned Jan. 16, 2000.

BACKGROUND

The present invention relates to roller rings and particularly to roller rings which are used in sheet folding mechanisms.

In folding sheets to form an envelope from a single sheet, the sheets are moved under adhesive applicators to apply strips of adhesive to the sheet. The sheet is then moved to a folding mechanism which comprises a plurality of rollers. These rollers fold the sheets in one or more directions in order to form an envelope. At least one of the rollers used in the folding mechanism is adapted to roll over the sheet with the strips of adhesive thereon. In order to prevent the adhesive from being smeared over a wide area of the sheet and the roller, it has been the practice to form grooves in the roller at that portion of the roller under which adhesive strips on the sheet will pass. This permits the roller grooves to overlie the strips of adhesive as the sheet is passing thereunder so that no adhesive comes into contact with the roller and will not smear or spread over the roller or the paper. In other words, when the sheet having the strips of adhesive moves under the roller, the strips of adhesive move under the grooves so that no adhesive is transferred from the sheet to the roller itself. However invariably, some adhesive finds its way into the grooves so that it becomes necessary to periodically clean out any adhesive that has accumulated in the roller grooves. This cleaning operation is time-consuming and awkward. It has sometimes been necessary to completely remove a roller and replace it with a fresh, clean roller. This means dismantling the machine and causing down-time of the machine usage.

OBJECTS

The present invention overcomes these drawbacks and has for one of its objects the provision of an improved folding machine roller assembly in which cleaning the roller grooves of adhesive may be easily accomplished.

Another object of the present invention is the provision of an improved folding machine roller assembly in which the grooves may be cleaned without disassembling the machine.

Another object of the present invention is the provision of an improved folding machine having roller rings for mounting in the grooves in the roller.

Another object of the present invention is the provision of roller rings which may be easily mounted in and removed from the grooves in the roller.

Other and further objects will be obvious upon the understanding of the illustrative embodiment about to be described, or which will be indicated in the appended claims, and various advantages not referred to herein, will occur to one skilled in the art upon employment of the invention in practice.

DRAWINGS

A preferred embodiment of the invention has been chosen for purposes of illustration and description and is shown in the accompanying drawings forming a part of the specification wherein.

DESCRIPTION

Figure 1:
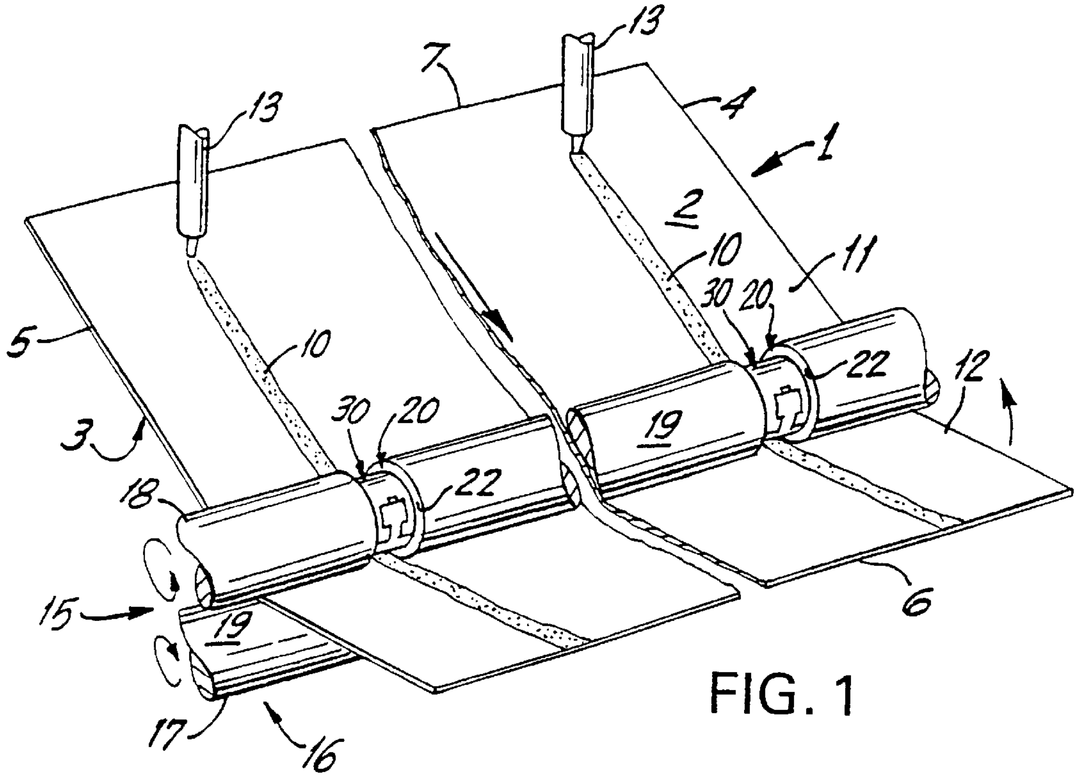
FIG. 1 is a diagrammatic highly stylized perspective view of a sheet folding machine made in accordance with the present invention.
Figure 2:
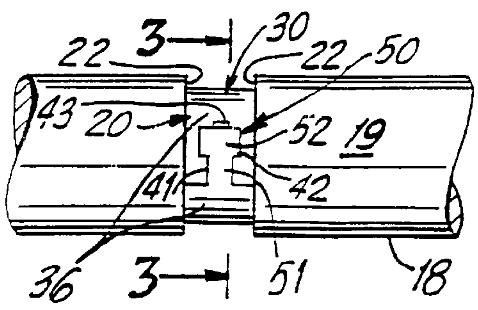
FIG. 2 is an enlarged detail of one of the rollers of the sheet folding machine shown in FIG. 1.
Figure 3:
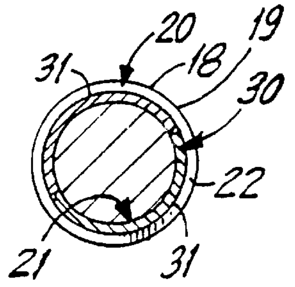
FIG. 3 is a sectional view taken along the lines 3—3 of FIG. 2.
Figure 4:
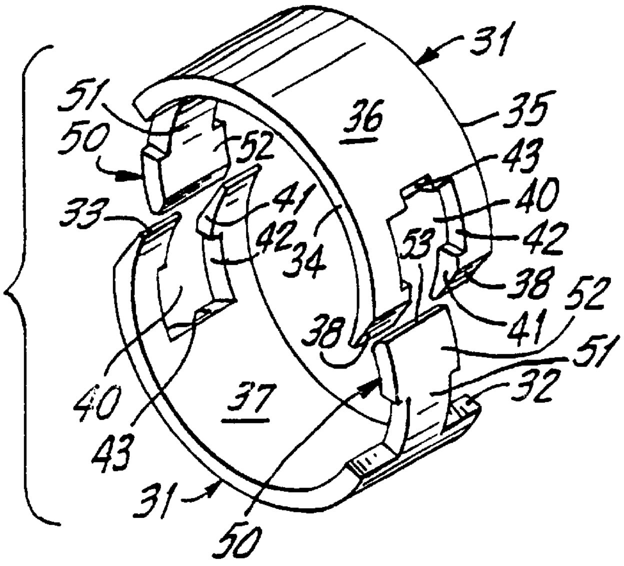
FIG. 4 is an exploded perspective view showing a roller ring adapted to be removably mounted in a roller groove.
Figure 5:
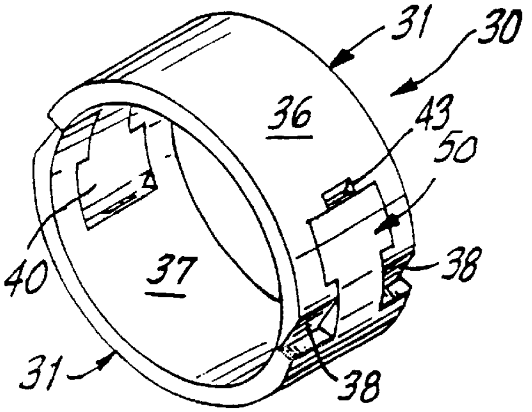
FIG. 5 is a perspective view similar to FIG. 4 showing the roller ring in its assembled position.
Figure 6:
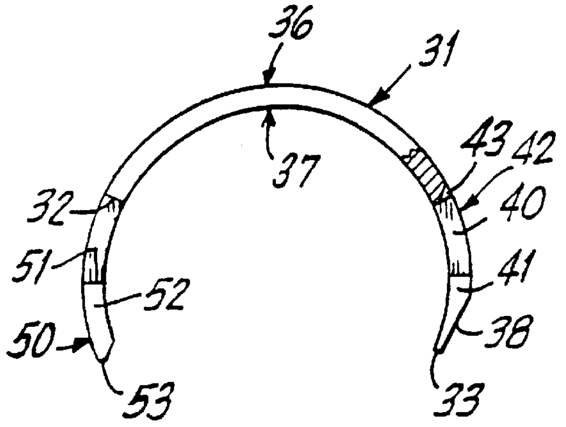
FIG. 6 is an edge view partially in section of one of the components of the roller ring shown in FIGS. 4 and 5.

The present invention is adapted to be used in a sheet folding mechanism which is shown in a highly simplified and diagrammatic form in FIG. 1. A sheet 1 is to be folded to form an envelope (not shown) by folding one or more panels, such as panel 12 in FIG. 1 relative to panel 11. The sheet 1 has a top face 2, a bottom face 3, sides edges 4–5 and front and rear edges 6–7. In order to form the envelope, adhesive strips 10 are deposited on the top face 2 of the sheet 1. When the sheet is folded, the adhesive strips 10 will cause the folded panels 11 and 12 (for example) of the sheet 1 to adhere together to form the envelope (not shown).

Referring again to FIG. 1, sheet 1 is fed to a sheet folding mechanism 15, which comprises roller assembly 16 having upper and lower rollers 17 and 18 each of which have outer surfaces 1 9.The rollers 17–18 are rotating in the direction of the arrow and the sheet 1 is moved between them. Adhesive is deposited in strips 10 on top face 2 adjacent to and spaced from the side edges 4–5 of the sheet 1 by applicators 13. When the sheet 1 passes between rollers 17–18, a panel 12 of the sheet 1 is deflected, bent upwardly, and superimposed over panel 11 (as is well-known in such folding machines) so that the adhesive strips 10 will adhere the panels 11 and 12 together.

In order to prevent the adhesive 10 from being smeared over the roller 18 and sheet 1 (which would render the sheet useless to form an envelope) grooves 20 are formed in the roller 18 Each groove 20 has a bottom wall 21 and upstanding opposed side walls 22. These grooves 20 will overlie the adhesive strips 10 as the sheet 1 passes beneath there so that the adhesive 10 does not contact the body of the roller 18 but remains under the grooves 20 and will not spread to other parts of the roller 18 or sheet 1. However, some adhesive will inevitably find its way into the grooves 20. Eventually, adhesive builds up in these grooves 20 and must be cleaned away.

In accordance with the present invention, a removable ring assembly 30 is mounted in each groove 20 so that any adhesive that finds its way into the grooves 20 will accumulate on top of the removable ring assembly 30. When the ring assembly 30 has been inundated with adhesive, the ring assembly 30 is removed from the groove 20 and a fresh clean ring assembly 30 is mounted in the groove 20. This can be done easily and quickly without dismantling the machine and with a minimum amount of down time.

The ring assembly 30 which is preferably used in the present invention comprises a plurality of ring segments, plurality in the form of a pair of segments or half-rings 31 which are preferably identical to each other and which mesh and interfit with each other to form the ring assembly 30. Each half-ring 31 has a pair of end edges 32–33, a pair of side edges of 34–35 and upper and lower faces 36–37. The thickness of the side edges 34–35 is less than the depth of the grooves 20 so that the upper face 36 of the ring assembly 30 will lie below the top surface 19 of roller 18 when the ring assembly 30 is inserted in grooves 20. The width of each ring assembly 30 is approximately the same as the width of each groove 20 so that each ring assembly 30 will fit tightly into the grooves 20 in order to prevent any glue from reaching the bottom of the groove 20.

One end edge 33 of half-ring 31 has tapered ends 38 which are tapered inwardly from the upper face 36 to the lower face 37 and outwardly toward the edge 33 and a holding notch 40 formed therein. The holding notch 40 is comprised of a neck portion 41, a square body portion 42 and head portion 43. The square body portion 42 is much wider than the neck portion 41 and the top head portion 43 is much narrower than the body portion 42. Protruding from the other end edge 32 there is a key assembly 50 comprising a neck portion 51, a square body portion 52 and an edge portion 53 which is tapered inwardly. The holding notch 40 and the key assembly 50 of each half ring 31 are adapted to nest, mesh and interfit with each other. The body portion 42 of the notch 40 receives the body portion 52 of the key assembly 50 and the neck portions 41 and 51, respectively, also mesh and fit together in order to form the finished ring assembly 30. The two rings halves 31 can be easily fitted together to form ring assembly 30 and can be easily disassembled from each other when the ring assembly 30 is to be removed from each groove 20. The key assembly 50 and the holding notch 40 should be in tight intermitting relationship with each other to minimize the amount of any adhesive reaching bottom wall 21 of the groove.

In operation, fresh half rings 31 are inserted into the grooves 20 to form ring assemblies 30 and the machine start to fold sheets 1 as set forth above. Any adhesive from the adhesive strips 10 until be deposited on top surface 36 of ring assemblies 30. When the groove 20 above the ring assemblies 30 becomes filled with adhesive, the ring assemblies 30 can be easily removed from the groove 20 by merely pushing one of the end edge 32–33 of one ring-half 31 away from the edge 32–33 of the other ring-half 31. This permits easy disassembly and removal of a ring assembly 30 from the groove 20 and leaves the groove 20 clean. Clean ring assemblies 30 can then be inserted into each of the grooves 20 so that operation of the machine can start immediately.

While this invention has been described in connection with the preferred use of a roller assembly 30 having a pair of substantially identical half rings 31 which interfit with each other, it will be understood that it is within the purview of the present invention for the roller assembly 30 to comprise more than two components or segments, components or segments which are not the same size circumferentially or components or segments which are not separable pieces but may be hingedly connected together.

It will thus be seen that the present invention provides an improved folding machine roller assembly in which the roller grooves will be easily cleaned without disassembling the machine in which roller rings are provided for easy mounting in and removal from the groove.

As many varied modifications of the subject matter of this invention will become apparent to those skilled in the art from the detailed description given hereinabove, it will be understood that the present invention is limited only as provided in the claims appended hereto.

The embodiments of the invention is which an exclusive property or privilege is claimed are defined as follows:

1. A ring assembly comprising a plurality of ring segments, said ring segments having means adapted to mesh and interfit with each other, each of said ring segments comprises a holding notch at one end and a key assembly at the other end, the holding notch and key assembly of one ring segment adapted to interfit and mesh with the holding notch and key assembly of another ring segment, said holding notch comprises a body portion and neck portion and said key assembly comprises a body portion and neck portion, the body and neck portions of the notch are adapted to mesh with the body and neck portions of the key assembly, the neck portions of the holding notch and the key assembly, said ring segments having an inner surface which is smooth and uninterrupted, said key assembly has a tapered edge and the ring segment adjacent the holding notch has a tapered edge tapered inwardly from an outer surface of the ring segment toward an inner surface thereof, the body portion of said holding notch having a head portion extending therefrom which is narrower than said body portion, the body portion of the key assembly is spaced from said key assembly edge and the body portion of the holding notch is spaced from said holding notch edge, each of said body portions being connected to said edges by said narrow elongated neck portions.

2. A ring assembly as set forth in claim 1 wherein said ring segments are of equal lengths.

3. A ring assembly as set forth in claim 2 wherein each of said ring segments is substantially identical to each other.

4. A ring assembly as set forth in claim 3 wherein said ring assembly comprises a pair of half-rings.

5. A ring segment comprising a holding notch at one end and a key assembly at the other end, the holding notch and the key assembly adapted to be complementary to each other, said holding notch comprises a body portion and neck portion and wherein said key assembly comprises a body portion and neck portion, the neck portions of the holding notch opening and the key assembly are elongated and narrower than the body portions of the holding notch and the key assembly, said key assembly has a tapered edge and the ring segment adjacent the holding notch has a tapered edge tapered inwardly from an outer surface of the ring segment toward an inner surface thereof, the body portion of said holding notch having a head portion extending therefrom which is narrower than the said body portion, the body portion of the key assembly is spaced from said key assembly edge and the body portion of the holding notch is spaced from said holding notch edge, each of said body portions being connected to said edges by said elongated narrow neck portions.

* * * * *